United States Patent
Glenn et al.

(10) Patent No.: US 9,392,574 B1
(45) Date of Patent: Jul. 12, 2016

(54) NOTIFICATION FACTORS AND RULES FOR PROACTIVE NOTIFICATION OF POTENTIAL SERVICE IMPACTS

(71) Applicant: Sprint Communications Company L.P., Overland Park, KS (US)

(72) Inventors: John R. Glenn, Overland Park, KS (US); William T. Hagstrum, Olathe, KS (US); Nicole E. Wunder, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/602,055

(22) Filed: Jan. 21, 2015

(51) Int. Cl.
*H04W 68/00* (2009.01)
*H04W 4/06* (2009.01)
*H04M 3/533* (2006.01)
*H04W 4/12* (2009.01)

(52) U.S. Cl.
CPC .......... *H04W 68/00* (2013.01); *H04M 3/53375* (2013.01); *H04W 4/06* (2013.01); *H04W 4/12* (2013.01)

(58) Field of Classification Search
CPC ....... H04W 68/00; H04W 24/00; H04W 4/06; H04W 4/12; H04M 3/53375; H04L 41/06
USPC .......................... 455/404.1, 405, 412.2, 414.1
See application file for complete search history.

(56) References Cited

U.S. PATENT DOCUMENTS

| 5,872,911 | A | * | 2/1999 | Berg | H04L 12/2602 379/111 |
|---|---|---|---|---|---|
| 6,169,881 | B1 | * | 1/2001 | Astrom | H04B 7/18519 455/12.1 |
| 6,353,902 | B1 | * | 3/2002 | Kulatunge | H04L 41/06 714/47.3 |
| 2004/0225916 | A1 | * | 11/2004 | Clark | H04L 41/065 714/25 |
| 2012/0190339 | A1 | * | 7/2012 | Abe | H04W 48/16 455/411 |
| 2013/0051239 | A1 | * | 2/2013 | Meredith | H04W 16/18 370/241 |
| 2013/0173514 | A1 | * | 7/2013 | Cruickshank, III | G06N 3/08 706/20 |
| 2014/0341081 | A1 | * | 11/2014 | Efrati | H04M 3/436 370/259 |
| 2015/0148028 | A1 | * | 5/2015 | Ge | H04W 24/04 455/421 |

* cited by examiner

*Primary Examiner* — Michael Mapa (57) ABSTRACT

A method of sending proactive notification of potential wireless communications service impacts. The method comprises when a top cell tower on a user equipment's notification cell tower list is forecast to have potential service impact, wherein a top cell tower is the cell tower with the most traffic volume usage by a user equipment on a notification cell tower list of the user equipment, sending a notification to the user equipment a predefined period of time before the potential service impact is forecast to occur, wherein the format of the notification is selected based on at least one of the type of a subscriber of the user equipment, a wireless communications service plan type, a call pattern, an interaction-with-customer-service pattern, and a churn risk level, wherein a churn risk level corresponds to a possibility of a subscriber transferring to another mobile communication network.

20 Claims, 9 Drawing Sheets

NOTIFICATION FACTORS AND RULES FOR PROACTIVE NOTIFICATION OF POTENTIAL SERVICE IMPACTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. A mobile communication network that maintains the cell towers may communicate with mobile communication devices that are supported by the mobile communication network in different manners and due to different reasons.

SUMMARY

In an embodiment, a method of sending proactive notification of potential wireless communications service impacts is disclosed. The method comprises recording, by an application, voice call activities for a plurality of user equipments through a plurality of cell towers for usage recording, building a list of notification cell towers for each of the plurality of user equipments based on usage during a past predefined period of time, and forecasting service impacts on the plurality of cell towers. The method further comprises when a top cell tower on a user equipment's notification cell tower list is forecast to have potential service impact, wherein a top cell tower is the cell tower with the most traffic volume usage by a user equipment on a notification cell tower list of the user equipment, sending a notification to the user equipment a predefined period of time before the potential service impact is forecast to occur, wherein the format of the notification is selected based on at least one of the type of a subscriber of the user equipment, a wireless communications service plan type, a call pattern, an interaction-with-customer-service pattern, and a churn risk level, wherein a churn risk level corresponds to a possibility of a subscriber transferring to another mobile communication network.

In an embodiment, a method of sending proactive notification of potential wireless communications service impacts is disclosed. The method comprises recording, by an application, voice call activities for a plurality of user equipments through a plurality of cell towers for usage recording, building a list of notification cell towers for each of the plurality of user equipments based on usage during a past predefined period of time, and forecasting service impacts on the plurality of cell towers. The method further comprises when a top cell tower on a notification cell tower list of a user equipment with a high churn subscriber is forecast to have potential service impact, wherein a high churn subscriber is a subscriber with a higher possibility than a predefined amount to transfer to another mobile communication network, wherein a top cell tower is the cell tower with the most traffic volume usage by a user equipment on a notification cell tower list of the user equipment, sending an email notification to the subscriber a predefined period of time before the potential service impact is forecast to occur.

In an embodiment, a method of sending proactive notification of potential wireless communications service impacts is disclosed. The method comprises recording, by an application, voice and data call activities for a plurality of user equipments through a plurality of cell towers for usage recording, building a list of notification cell towers for each of the plurality of user equipments based on usage during a past predefined period of time, and forecasting service impacts on the plurality of cell towers. The method further comprises when a top cell tower on a user equipment's notification cell tower list is forecast to have potential service impact, wherein a top cell tower is the cell tower with the most traffic volume usage by a user equipment on a notification cell tower list of the user equipment, sending to user equipments with high value subscribers a text message notification and a dedicated customer care telephone number a predefined period of time before the potential service impact is forecast to occur, sending a text message notification to devices with medium and low value subscribers a predefined period of time before the potential service impact is forecast to occur, and sending an email notification to high churn subscribers a predefined period of time before the potential service impact is forecast to occur, wherein a high churn subscriber is a subscriber with a higher possibility than a predefined amount to transfer to another mobile communication network. The method further comprises when any of the cell towers on a notification cell tower list of a user equipment, with a subscriber that calls customer care more than a predefined amount of times every unit time period on average, is forecast to have potential service impact, sending a text message notification to the user equipment.

These and other features will be more clearly understood from the following detailed description taken in conjunction with the accompanying drawings and claims

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When service impact is associated with a base transceiver station, an enhanced Node B(eNB), or a cell tower, it is desirable to send a notification to associated users or subscribers of a mobile communication network that maintains the cell tower. For example, within the first few days when a cell tower is just upgraded from a third generation (3G) cell tower to a long-term evolution (LTE) cell tower, configurations and/or settings of the newly upgraded cell tower may be adjusted and the performance of the cell tower may be affected. A notification to user equipments that use the cell tower as a major cell tower may be desirable. The present disclosure teaches a system and method for proactively sending a notification of potential service impacts to user equipments.

For example, an application on a server computer maintained by the mobile communication network may keep a record of data and/or voice call activities initiated by user equipments through cell towers for usage recording purposes. For example, the application may rank cell towers in an order for a specific user equipment based on usage, for example, voice and/or data traffic volume, total use time period, call attempt times, or another type of usage standard, by the user equipment through each cell tower. The application may build a list of notification cell towers for each user equipment using the most used N cell towers (e.g., top 5 most used cell towers, top 3 most used cell towers). For example, the most used cell towers that contribute to 80% of the total usage by a user equipment may be recorded in a notification cell tower list of the user equipment. The application may build a list of top user equipments for each cell tower using user equipments that have the cell tower in their notification cell tower list. Additionally, the application may obtain cell tower forecast information, for example from a cell tower forecast application.

When a top cell tower on a notification cell tower list of a user equipment is forecast to have potential service impacts, a notification may be sent by the application to the user equipment a predefined period of time before the potential service impact is forecast to occur, for example 7 days, 5 days, 3 days, or some other period of time before. A top cell tower is the cell tower with the most usage by a user equipment on the notification cell tower list of the user equipment. The format of the notification may be at least one of a text message, an email message, a voice mail message, or another type of notification. The format of the notification may be selected based on at least one of the subscriber type of the user equipment, a wireless communications service plan type, a call pattern, an interaction-with-customer-service pattern, and/or a churn risk level of the subscriber.

For example, when a subscriber of the user equipment is a high value subscriber, both a text message notification and a dedicated customer care telephone number may be sent to the user equipment. The high value subscriber may call the dedicated customer care telephone number inquiring about the potential service impact. Alternatively, both a text message notification and a personalized voice mail message may be sent to the user equipment. When a subscriber of the user equipment is a medium or low value subscriber, a text message notification may be sent to the user equipment.

When a subscriber of the user equipment is a high churn subscriber, only an email message notification may be sent to the subscriber instead of a text message notification. A high churn subscriber may be a subscriber with a high churn rate of switching mobile communication networks or wireless providers. Sending too many text messages to a high churn subscriber may increase dissatisfaction of the subscriber and may cause the churn rate of the subscriber to rise even higher. Thus, by sending an email message notification instead of a text message notification to a high churn subscriber, better balance of service and support from a wireless provider may be achieved. Alternatively, in the case of a high churn subscriber no email notification and no text message may be sent to the subscriber, with the thought that it is undesirable to stimulate the subscriber to discontinue his or her subscription service (e.g., "churn") and that the subscriber may not even experience service degradation. When a subscriber of the user equipment calls customer care an amount of times larger than a predefined amount every unit time, a text message notification may be sent to the user equipment when any of the cell towers on the notification cell tower list of the user equipment is forecast to have potential service impact.

Alternatively or additionally, a second predefined time period before the potential service impact is forecast to occur, a second wireless network different from a home wireless network of a user equipment may be selected, e.g., automatically by a corresponding application on the user equipment, for the user equipment to utilize. The second predefined time period may be different from the predefined period of time to send a notification before the potential service impact. After the service impact issue is solved and/or normal service returns to the previously impacted cell tower, the home wireless network may be selected again for the user equipment.

Figure 1:
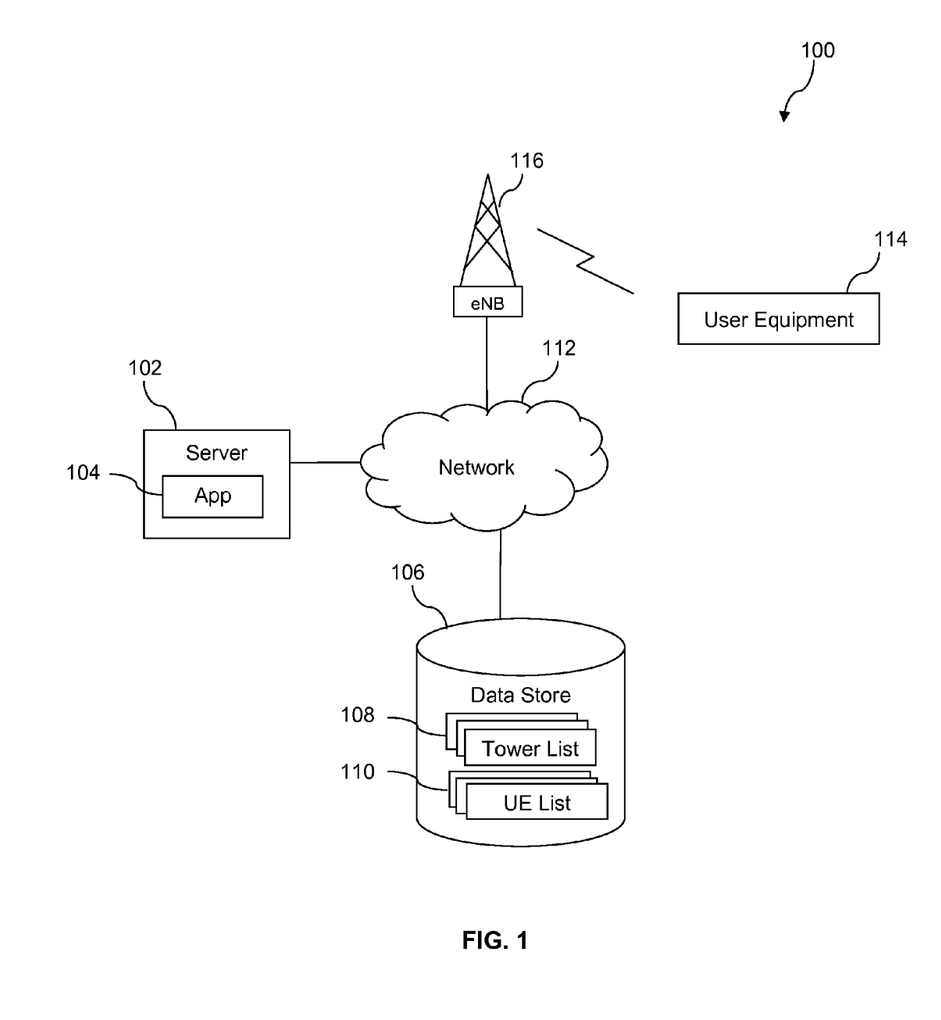
FIG. 1 is an illustration of a communication system according to an embodiment of the disclosure.

Turning now to FIG. 1, a communication system 100 is described. In an embodiment, the communication system 100 comprises a server computer 102, a plurality of user equipments (UEs) 114, and a data store 106. The server 102 may comprise an application 104. The user equipment 114 may alternatively be referred to in some contexts as a mobile communication device or a mobile device. The data store 106 may comprise a plurality of notification cell tower lists 108 and a plurality of user equipment lists 110. The user equipment 114 may be configured to use a radio transceiver to establish a wireless communication link with an enhanced Node B (eNB) 116, and the eNB 116 may provide communications connectivity of the user equipment 114 to a network 112. The eNB 116 may alternatively be referred to in some contexts as a base transceiver station (BTS) or a cell tower. The server 102 and the data store 106 may also have access to the network 112. The network 112 may comprise any combination of private and public networks.

It is understood that the system 100 may comprise any number of user equipments 114, any number of eNBs 116, any number of servers 102, and any number of data stores 106. The collectivity of eNBs 116 may be said to comprise a radio access network, in that these eNBs 116 may provide a radio communication link to the user equipments 114 to provide access to the network 112.

The radio transceiver of the user equipment 114 may communicate with the eNB 116 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. While a user equipment 114 or smart phone is used in a preferred embodiment, the teachings of the present disclosure may also be extended to other mobile communication devices such as a mobile phone, a personal digital assistant (PDA), a media player, a laptop computer, a tablet computer, a notebook computer, a wearable computer, a headset computer, or another network/communications capable device. In an embodiment, the user equipment 114 may have other components (not shown) such as a near field communication (NFC) radio transceiver, a short range radio transceiver such as a wireless local area network (WLAN) radio transceiver, or other components.

In an embodiment, the application 104 may be stored in a memory of the server 102. When executed by a processor of the server 102, the application 104 may perform a variety of functionality according to factors and rules for proactive notification of potential service impacts. For example, the application 104 may obtain potential service impacts information from a cell tower forecast application. The application 104 may record voice and/or data call activities of user equipments 114 through eNBs 116 or cell towers. The eNBs 116 may be referred to as base transceiver stations or cell towers 116 hereinafter. The application 104 may obtain forecasting information on service impacts of cell towers 116, for example from a cell tower forecast application. The application 104 may build a notification cell tower list 108 for each user equipment 114 with a predefined number of cell towers that the user equipment 114 uses the most.

The application 104 may also build a user equipment list 110 for each cell tower 116 with user equipment(s) 114 that has that cell tower 116 on a notification cell tower list 108 of the user equipment(s) 114. When a potential service impact of a cell tower 116 is forecast, the application 104 may send a notification of the potential service impact to a top user equipment 114 of the cell tower 116 a predefined period of time before the potential service impact. A top user equipment 114 of a cell tower 116 may be a user equipment 114 that has the cell tower 116 on its notification cell tower list 108. As introduced earlier, the top user equipment 114 may also be on the user equipment list 110 of the cell tower 116. The format of the notification sent to a top user equipment 114 may be determined by predefined rules.

For example, the application 104 may record voice and/or data call activities for each user equipment 114 associated with cell towers 116 for usage recording and/or counting purposes. For example, the application 104 may record voice and/or data call attempts from a particular user equipment 114 over a recent window of time, for example over the most recent 7 days, over the most recent 15 days, over the most recent 30 days, or some other time interval. The application 104 may count the number of times the user equipment 114 uses cell towers 116 for voice and/or data calls. The application 104 may store this information in the data store 106, for example into an entry in the data store 106 associated with the user equipment 114. The cell towers 116 may be ranked in order from the most used cell tower to the least used cell tower, for example voice and/or data traffic volume, total use time period, call attempt times, or another type of usage standard.

Based on the usage of the cell towers 116, the application 104 may build a notification cell tower list 108 for the user equipment 114. For example, a subtotal of usage associated with the cell towers 116 with the most usage by the user equipment 114 may be calculated. A total usage from the user equipment 114 associated with cell towers may be calculated. A ratio of the subtotal usage over the total usage by the user equipment 114 may also be calculated. The ratio may be compared with a predefined amount. When the ratio is smaller than the predefined amount, the subtotal usage and the ratio may be recalculated. The subtotal usage may be recalculated by adding usage from a cell tower 116 with less usage in the cell tower order to an existing subtotal usage. When the ratio of the subtotal usage over the total usage by the user equipment 114 exceeds a predefined amount, the calculation of the subtotal may be stopped or halted, and the cell towers 116 that contribute to the subtotal usage may be selected to be recorded on the notification cell tower list 108.

In an embodiment, the notification cell tower list 108 may be periodically re-determined by the application 104 based on predefined rules, for example every 10 days, every 15 days, every 30 days, or at some other periodic interval. Note that the period of time over which the call activities are recorded may be different from the period of time when the cell tower list 108 is re-determined. For example, the call activities may be collected and recorded over the last month, and the notification cell tower list 108 may be re-determined every day. The application 104 may also build at least one top user equipment list 110 for each cell tower 116. Top user equipment(s) 114 for a cell tower 116 may be user equipments 114 that have the cell tower 116 on its notification cell tower list 108.

When any cell tower or a top cell tower on a user equipment's 114 notification cell tower list 108 is forecast or predicted to have potential service impact, the application 104 may send a notification to the user equipment 114 a predefined period of time before the potential service impact is forecast to occur. A top cell tower of a user equipment 114 may be the cell tower 116 with the most usage on a notification cell tower list 108 of the user equipment 114. A user equipment 114 may have more than one top cell tower, for example 3, 4, 5, or some other number of top cell towers. For instance, the top three most frequently utilized cell towers 116 of a user equipment 114 on its notification cell tower list 108 may be top cell towers of the user equipment 114. For example, when the cell tower forecast application sends a notification to the application 104 of the potential service impact of a cell tower 116, the application 104 may send a notification to corresponding user equipments 114. Alternatively, the application 104 may periodically examine the cell tower forecast application for any potential service impact. When any potential service impact is obtained by the application 104, the application 104 may send a notification to corresponding user equipments 114. The predefined period of time a notification may be sent by the application 104 may be 7 days, 5 days, 3 days, or some other period of time before the forecast service impact.

A notification may be sent in the format of a text message, an email message, a voice mail message, or in some other format. The format of the notification may be selected based on the type of the subscriber of the user equipment 114, a wireless communications service plan type of the user equipment 114, a call pattern of the user equipment 114, an interaction-with-customer-service pattern of the user equipment 114, and/or a churn risk level of the subscriber. A churn risk level may correspond to a possibility of a subscriber transferring to another mobile communication network, e.g., transferring his or her subscription fees to another company. A notification may be sent by the application 104 when a top cell tower is expected to have potential service impacts and/or when any of the cell towers on a user equipment's notification cell tower list 108 is expected to have potential service impacts, and this may be determined by the subscriber type of the user equipment 114.

For example, a text message notification may be sent to a user equipment 114 of a medium or low value subscriber a predefined period of time before the forecast potential service impact is forecast to occur when a top cell tower on the user equipment's notification cell tower list 108 is forecast to have the potential service impact. When a subscriber of a user equipment 114 is a high value subscriber, a text message notification and a dedicated customer care telephone number may be sent to the user equipment 114 a predefined period of time before the potential service impact is forecast to occur. The high value subscriber may call the dedicated customer care telephone number regarding the potential service impact. Alternatively, a text message notification may be sent to the user equipment 114 of the high value subscriber, and a personalized voice mail message may be left on the user equipment 114 regarding the potential service impact a predefined period of time before the potential service impact is forecast to occur.

In an embodiment, instead of a text message notification, an email notification may be sent to a user equipment 114 of a high churn subscriber a predefined period of time before the potential service impact is forecast to occur. A high churn subscriber may be a subscriber with a higher possibility than a predefined amount to transfer to another mobile communication network. Thus, by sending an email notification in lieu of a text message to the user equipment 114 of the high churn subscriber, the high churn subscriber's moving out of the current mobile communication network may be avoided or limited.

For a user equipment 114 with a subscriber that calls customer care more than a predefined amount of times every unit time period on average, when any of the cell towers 116 on a notification cell tower list 108 of the user equipment 114 is forecast to have potential service impact, a text message notification may be sent to the user equipment 114 by the application 104. Said in other words, not only when the top tower on the notification tower list of the user equipment 114 is forecast to have potential service impact, a text message notification may be sent to the user equipment 114, but when any of the towers on the notification tower list of the user equipment 114 is forecast to have potential service impact, a text message notification may be sent to the user equipment 114.

In an embodiment, a threshold of traffic volume usage used to determine which cell towers to be recorded on a notification cell tower list 108 may be a fixed value or adapted dynamically. For example, a predefined fixed value of the threshold may be any of 75%, 80%, 85%, or some other value. Alternatively, the threshold may be dynamic and may be adapted according to a variety of factors. For example, when a subscriber of a user equipment 114 commutes daily on weekdays and 75% of data and voice usage is with four most used cell towers and 5% with one next cell tower in order of usage, only the four most used cell towers may be recorded on the notification cell tower list 108. A subscriber of a user equipment 114 that received a notification of potential service impact for a cell tower 116 may access the status of the service impact on and/or resolution progress of the cell tower, for example through a website or a mobile application.

Figure 2:
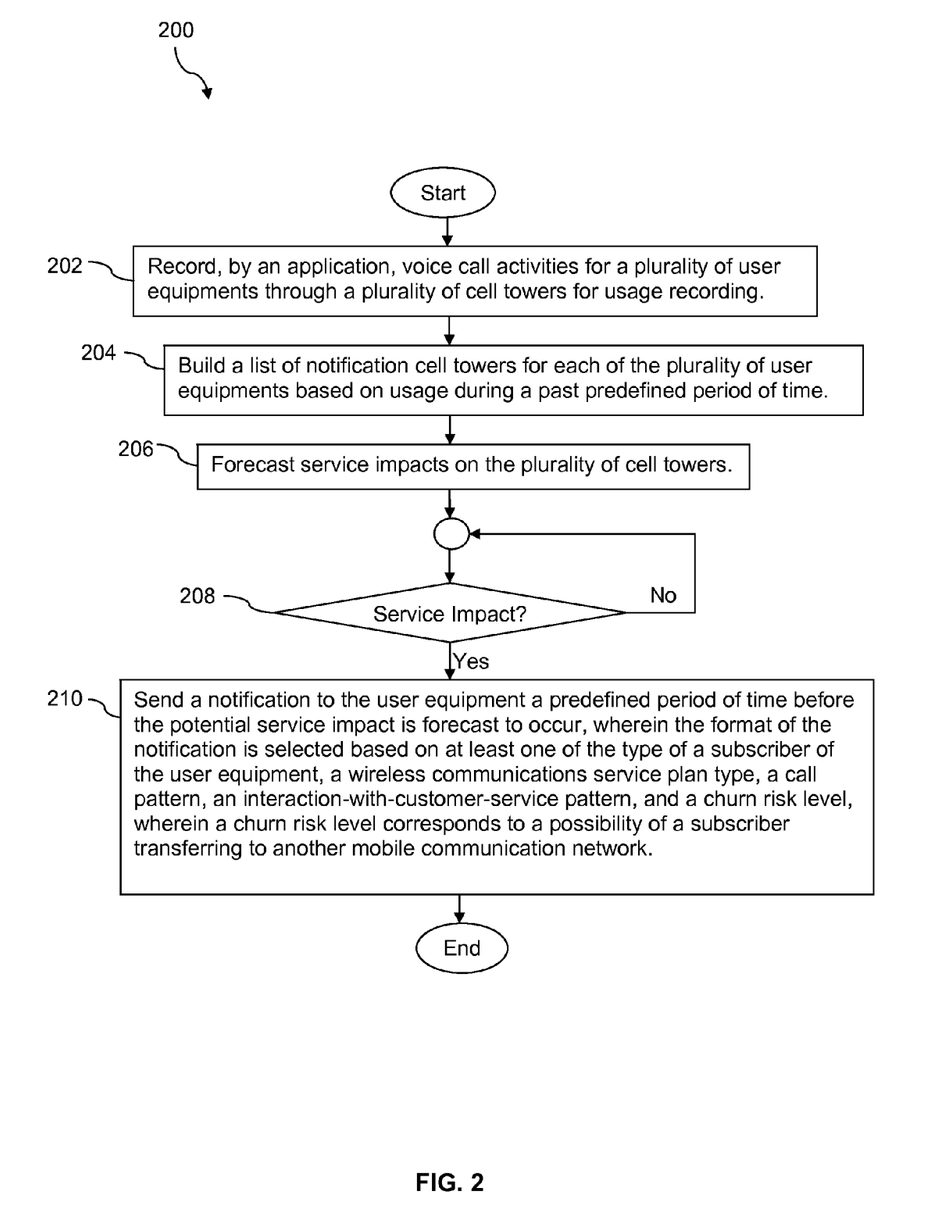
FIG. 2 is a flow chart illustrating a method according to an embodiment of the disclosure.

Turning now to FIG. 2, a method 200 is described. At block 202, voice call activities for a plurality of user equipments through a plurality of cell towers are recorded by an application for usage recording. For example, voice call activities for a plurality of user equipments 114 through a plurality of cell towers 116 may be recorded by the application 104 for usage recording and/or counting purposes. At block 204, a list of notification cell towers is built for each of the plurality of user equipments based on usage during a past predefined period of time. For example, a notification cell tower list 108 may be built for each of the plurality of user equipments 114 based on usage during a past predefined period of time, for example 10 days, 15 days, 30 days, or some other period of time. At block 206, service impacts on the plurality of cell towers are forecasted. For example, the application 104 may obtain cell tower forecast information identifying forecasted potential service impacts from a cell tower forecast application.

At block 208, when a top cell tower on a user equipment's notification cell tower list 108 is forecast to have potential service impact, wherein a top cell tower is the cell tower 116 with the most traffic volume usage by a user equipment on a notification cell tower list 108 of the user equipment 114, the process proceeds to block 210. On the other hand, when the top cell tower is not forecast to have potential service impact, the process goes back to block 208 to examine whether another top cell tower is forecast to have potential service impact. For the purpose of making the drawing concise and readable, it is not shown in FIG. 2 that block 208 of method 200 is applied to each top cell tower of each of the plurality of user equipments.

At block 210, a notification is sent to the user equipment 114 a predefined period of time before the potential service impact is forecast to occur, wherein the format of the notification is selected based on at least one of the type of a subscriber of the user equipment 114, a wireless communications service plan type, a call pattern, an interaction-with-customer-service pattern, and a churn risk level, wherein a churn risk level corresponds to a possibility of a subscriber transferring to another mobile communication network.

Figure 3:
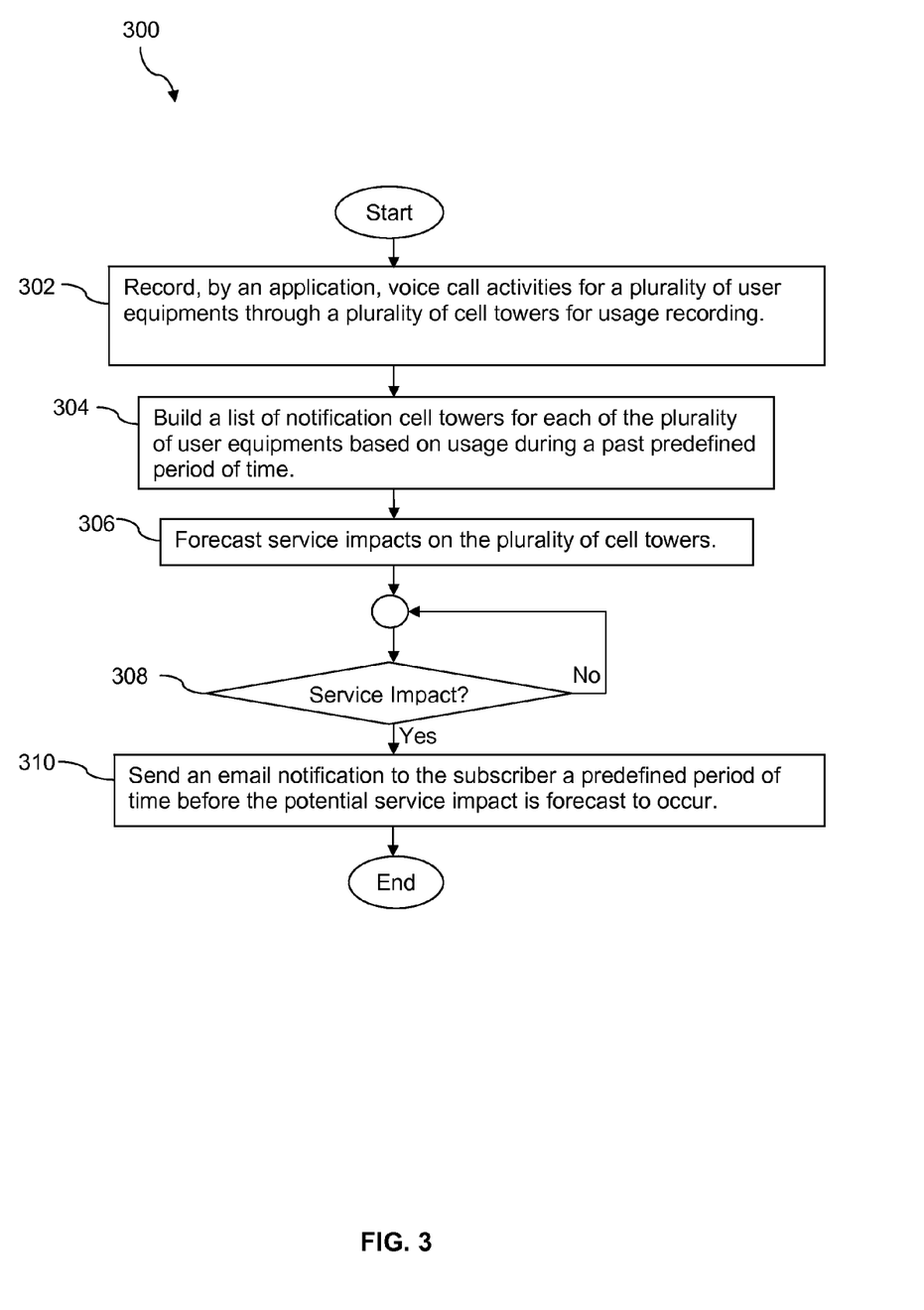
FIG. 3 is a flow chart illustrating another method according to an embodiment of the disclosure.

Turning now to FIG. 3, a method 300 is described. At block 302, voice call activities for a plurality of user equipments 114 through a plurality of cell towers 116 are recorded by an application 104 for usage recording. At block 304, a list of notification cell towers 108 is built for each of the plurality of user equipments 114 based on usage during a past predefined period of time. At block 306, service impacts on the plurality of cell towers 116 are forecasted.

At block 308, when a top cell tower on a notification cell tower list 108 of a user equipment 114 with a high churn subscriber is forecast to have potential service impact, wherein a high churn subscriber is a subscriber with a higher possibility than a predefined amount to transfer to another mobile communication network, wherein a top cell tower is the cell tower 116 with the most traffic volume usage by a user equipment on a notification cell tower list 108 of the user equipment 114, the process proceeds to block 310. On the other hand, when the top cell tower is not forecast to have potential service impact, the process goes back to block 308 to examine whether another top cell tower is forecast to have potential service impact. For the purpose of making the drawing concise and readable, it is not shown in FIG. 3 that block 308 of method 300 is applied to each top cell tower of each of the plurality of user equipments. At block 310, an email notification is sent to the subscriber a predefined period of time before the potential service impact is forecast to occur.

Figure 4A:
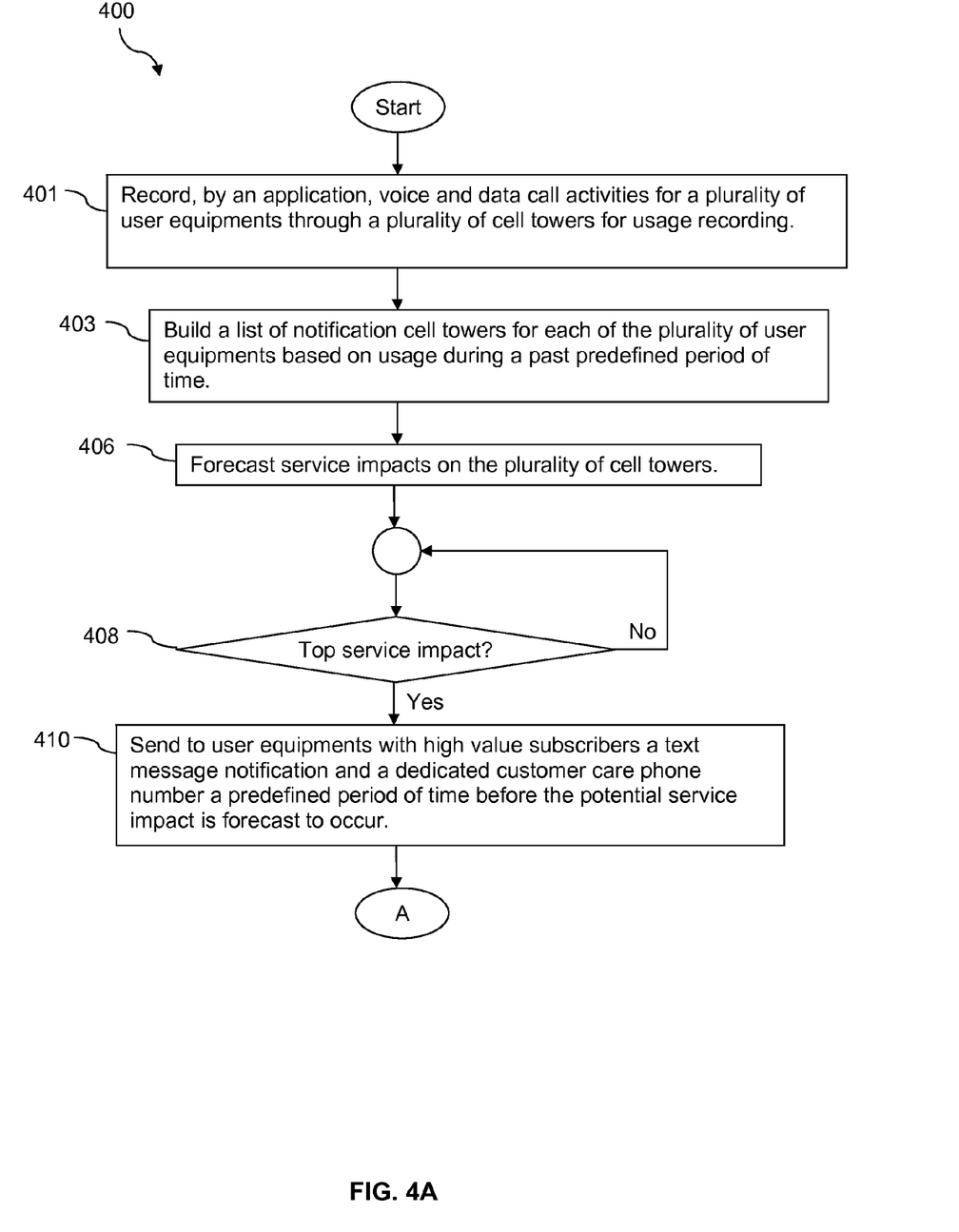
FIG. 4A and FIG. 4B are a flow chart illustrating a third method according to an embodiment of the disclosure.
Figure 4B:
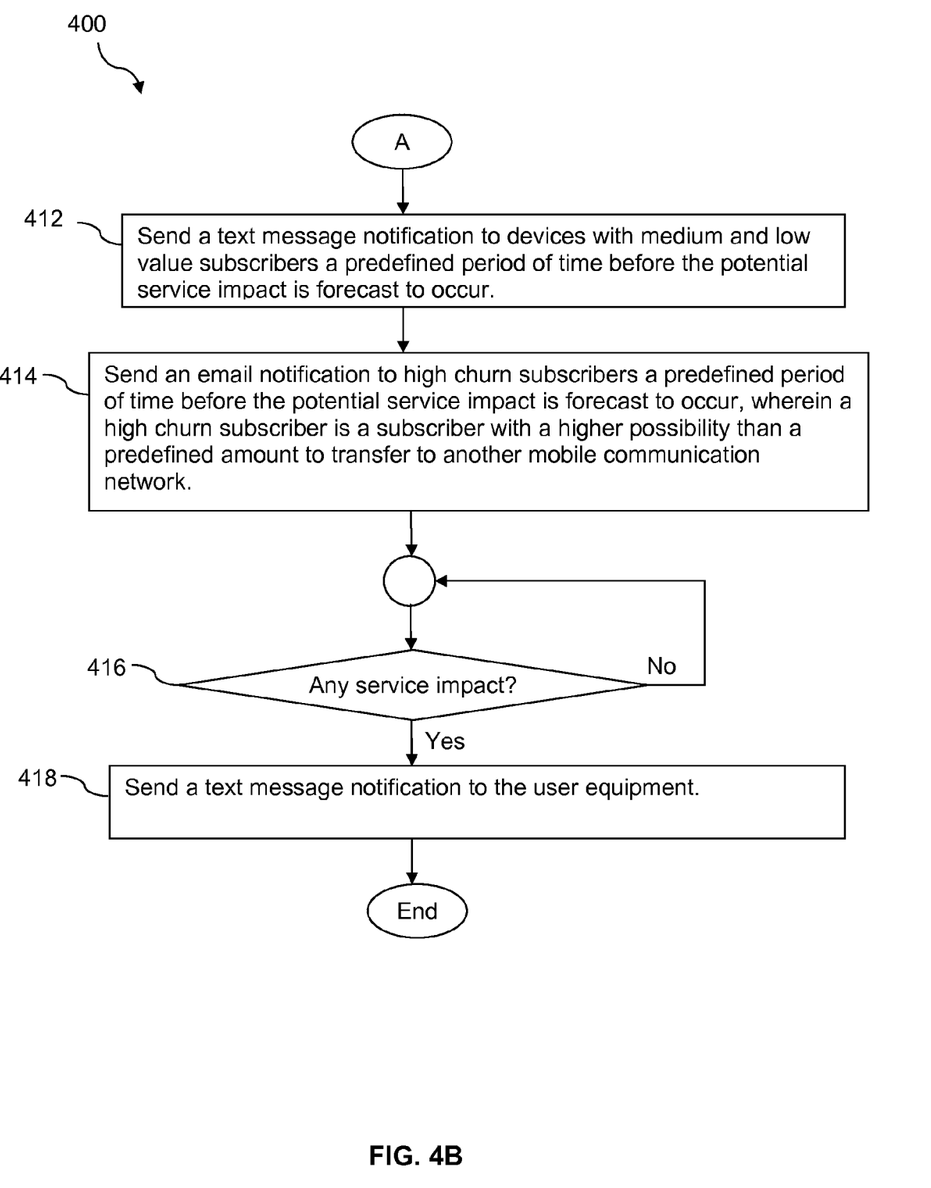

Turning now to FIG. 4A and FIG. 4B, a method 400 is described. At block 401, voice and data call activities for a plurality of user equipments 114 through a plurality of cell towers 116 are recorded by an application 104 for usage recording. At block 403, a list of notification cell towers 108 is built for each of the plurality of user equipments 114 based on usage during a past predefined period of time. At block 406, service impacts on the plurality of cell towers 116 are forecasted.

At block 408, when a top cell tower on a user equipment's notification cell tower list 108 is forecast to have potential service impact, wherein a top cell tower is the cell tower 116 with the most traffic volume usage by a user equipment on a notification cell tower list 108 of the user equipment 114, the process proceeds to block 410. On the other hand, when the top cell tower is not forecast to have potential service impact, the process goes back to block 408 to examine whether another top cell tower is forecast to have potential service impact. For the purpose of making the drawing concise and readable, it is not shown in FIG. 4A that block 408 of method 400 is applied to each top cell tower of each of the plurality of user equipments.

At block 410, a text message notification and a dedicated customer care telephone number are sent to user equipments 114 with high value subscribers a predefined period of time before the potential service impact is forecast to occur. At block 412, a text message notification is sent to user equipments 114 with medium and low value subscribers a predefined period of time before the potential service impact is forecast to occur. At block 414, an email notification is sent to high churn subscribers a predefined period of time before the potential service impact is forecast to occur, wherein a high churn subscriber is a subscriber with a higher possibility than a predefined amount to transfer to another mobile communication network.

At block 416, when any of the cell towers 116 on a notification cell tower list 108 of a user equipment 114, with a subscriber that calls customer care more than a predefined amount of times every unit time period on average, is forecast to have potential service impact, the process proceeds to block 418. On the other hand, when none of the cell towers 116 on the notification cell tower list 108 is forecast to have potential service impact, the process goes back to block 416 to examine whether another cell tower 116 on the notification cell tower list 108 or another notification cell tower list 108 is forecast to have potential service impact. For the purpose of making the drawing concise and readable, it is not shown in FIG. 4B that block 416 of method 400 is applied to each cell tower of each of the notification cell tower lists 108. At block 418, a text message notification is sent to the user equipment 114. Note that if the cell tower that has been forecast to have potential service impact is a top cell tower that has been forecast to have potential service impact in block 408 and/or a text message notification has been sent to the user equipment 114 regarding the potential service impact, no text message notification may be sent to the user equipment 114.

Figure 5:
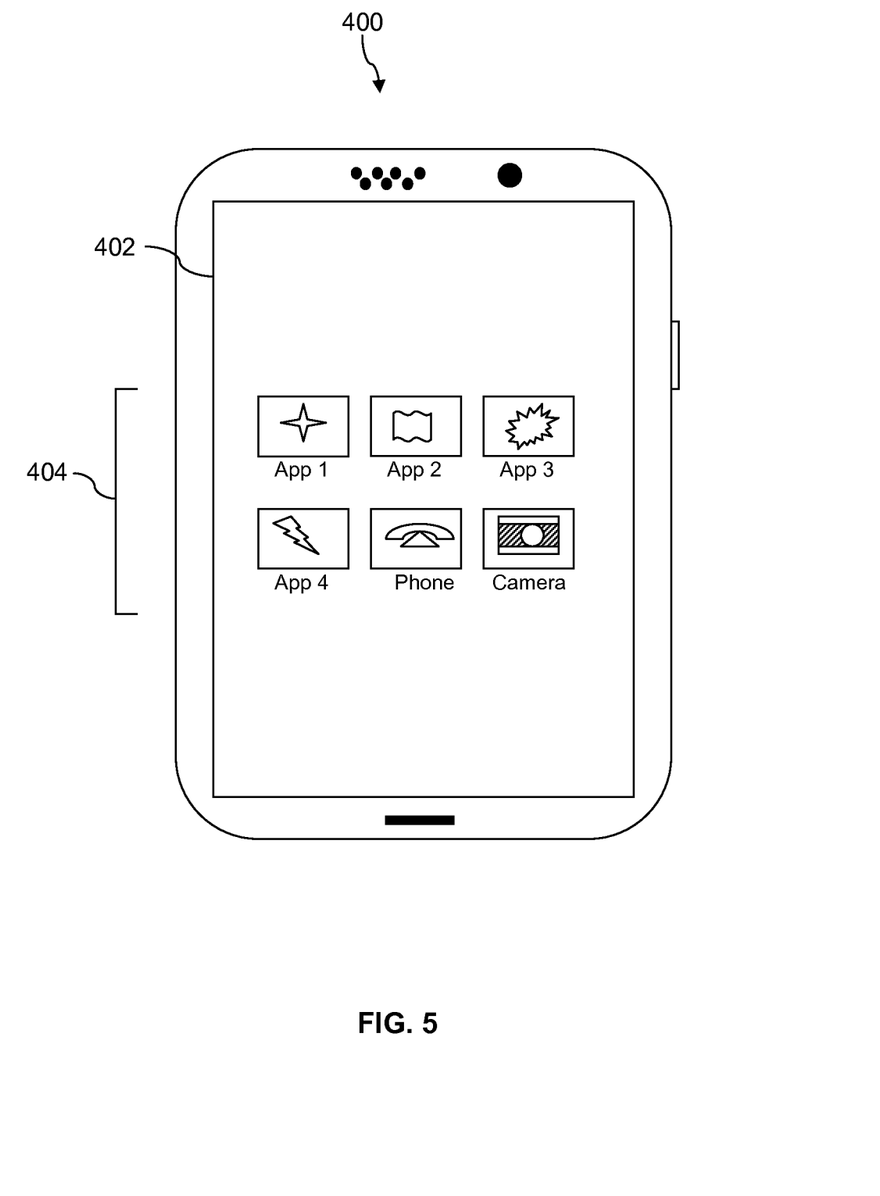
FIG. 5 is an illustration of a user equipment according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
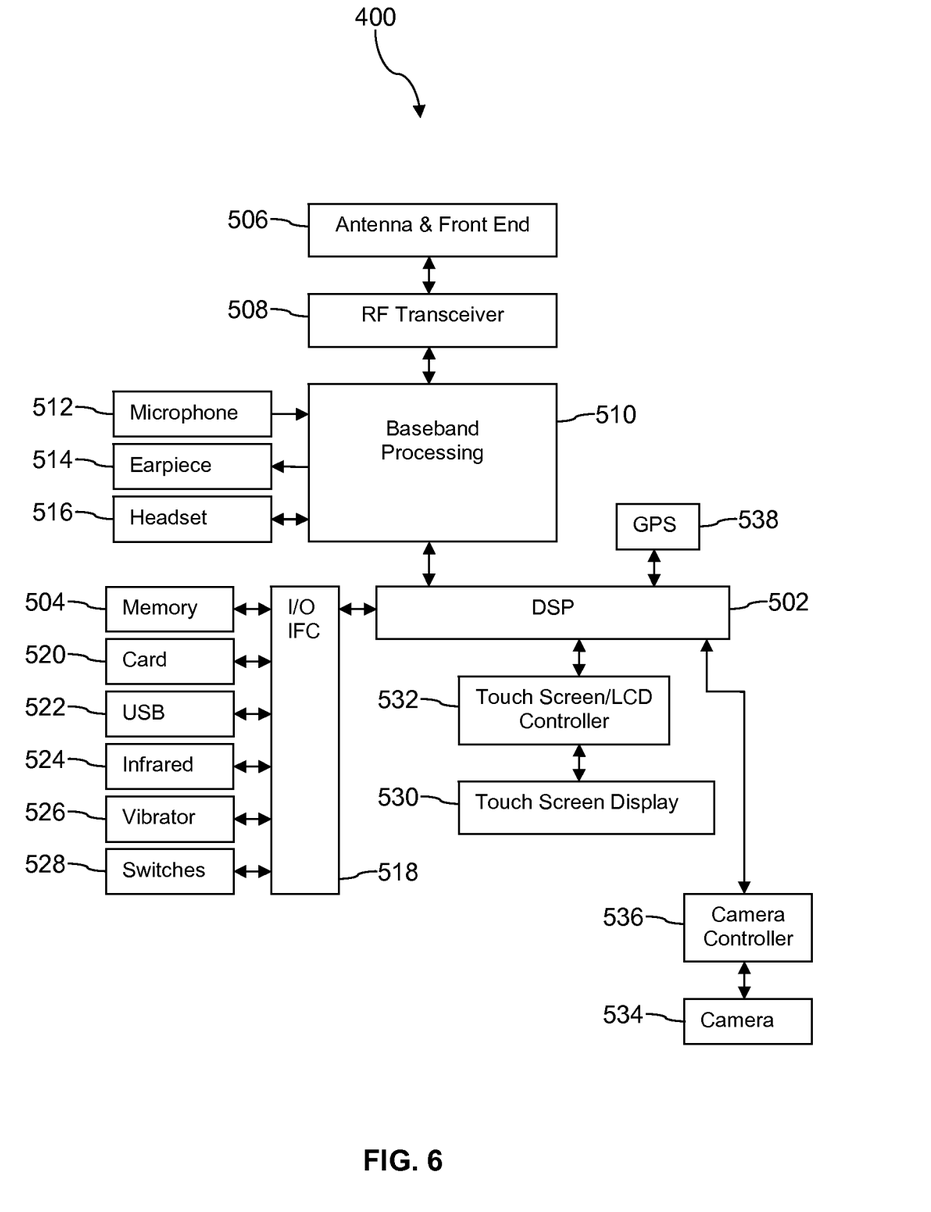
FIG. 6 is a block diagram of a user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
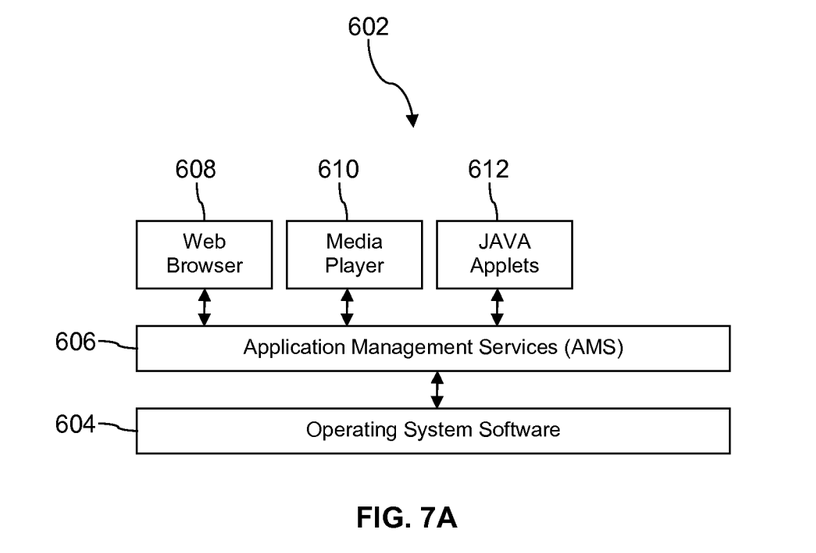
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the user equipment 400. Also shown in FIG. 7A are a web browser application 608, a media player application 610, and JAVA applets 612. The web browser application 608 may be executed by the user equipment 400 is coupled to a network via a wireless link. The web browser application 608 may permit a user to enter information into forms and select links to retrieve and view web pages. The media player application 610 may be executed by the user equipment 400 to play audio or audiovisual media. The JAVA applets 612 may be executed by the user equipment 400 to provide a variety of functionality including games, utilities, and other functionality.

Figure 7B:
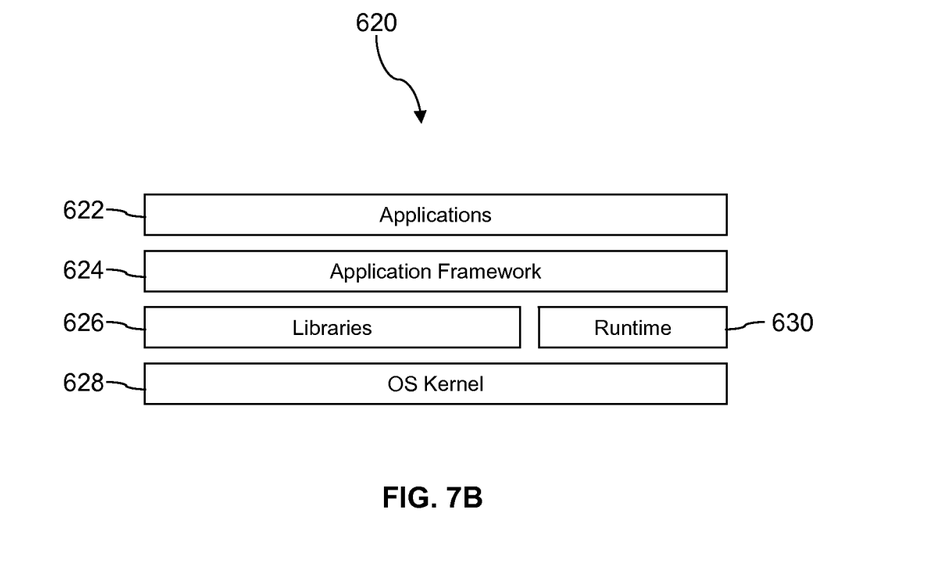
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
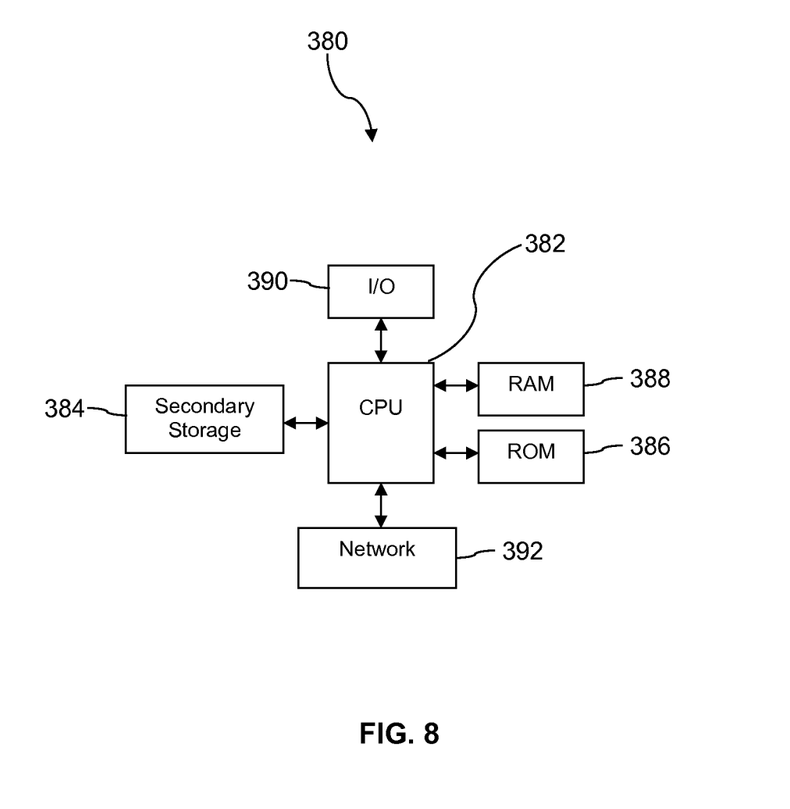
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of sending proactive notification of potential wireless communications service impacts, comprising:

recording, by an application, voice call activities for a plurality of user equipments through a plurality of cell towers for usage recording;

building a list of notification cell towers for each of the plurality of user equipments based on usage during a past predefined period of time;

forecasting service impacts on the plurality of cell towers; and when a top cell tower on a user equipment's notification cell tower list is forecast to have potential service impact, wherein a top cell tower is the cell tower with the most traffic volume usage by a user equipment on a notification cell tower list of the user equipment:

sending a notification to the user equipment a predefined period of time before the potential service impact is forecast to occur, wherein the format of the notification is selected based on at least one of the type of a subscriber of the user equipment, a wireless communications service plan type, a call pattern, an interaction-with-customer-service pattern, and a churn risk level, wherein a churn risk level corresponds to a possibility of a subscriber transferring to another mobile communication network.

2. The method of claim 1, wherein cell towers with the most usage from a user equipment and with a ratio of subtotal usage over total usage from the user equipment exceeding a predefined percentage are selected to be recorded on the notification cell tower list.

3. The method of claim 2, wherein when 80% of the user equipment's usage is through a number of cell towers with the most usage by the user equipment, these towers are added to the notification cell tower list of the user equipment.

4. The method of claim 2, wherein the predefined percentage is adapted based on the subscriber type.

5. The method of claim 4, wherein when a subscriber of the user equipment commutes daily on weekdays and 75% of the usage is related to a first number of cell towers and 5% is related to a second number of cell towers, the first number of cell towers are recorded on the notification cell tower list of the user equipment.

6. The method of claim 1, wherein high value customers are notified of the potential service impacts with a dedicated phone number to call.

7. The method of claim 1, wherein the potential service impacts on the plurality of cell towers are obtained from a cell tower forecast application.

8. The method of claim 1, wherein when any cell tower on a notification cell tower list of a user equipment whose subscriber calls customer care more than a predefined amount of times every unit time period on average is forecast to have potential service impact, a text message notification is sent to the user equipment a predefined period of time before the potential service impact.

9. The method of claim 1, further comprising, building a list of top user equipments for each of the plurality of cell towers and sending a notification to top user equipments on a top user equipment list of a cell tower when the cell tower is forecast to have potential service impact, wherein top user equipments are user equipments that have the cell tower on their notification cell tower list.

10. A method of sending proactive notification of potential wireless communications service impacts, comprising:

recording, by an application, voice call activities for a plurality of user equipments through a plurality of cell towers for usage recording;

building a list of notification cell towers for each of the plurality of user equipments based on usage during a past predefined period of time;

forecasting service impacts on the plurality of cell towers; and when a top cell tower on a notification cell tower list of a user equipment with a high churn subscriber is forecast to have potential service impact, wherein a high churn subscriber is a subscriber with a higher possibility than a predefined amount to transfer to another mobile communication network, wherein a top cell tower is the cell tower with the most traffic volume usage by a user equipment on a notification cell tower list of the user equipment, sending an email notification to the subscriber a predefined period of time before the potential service impact is forecast to occur.

11. The method of claim 10, wherein a subscriber of a user equipment that received a notification of potential service impact for a cell tower can access the status of the service impact on the cell tower.

12. The method of claim 10, further comprising, a predefined period of time before potential service impact, sending a text message notification to a user equipment with a non-high-churn subscriber when a top cell tower on a notification cell tower list of the user equipment is forecast to have the potential service impact.

13. The method of claim 12, wherein when the subscriber is a high value subscriber, a dedicated phone number is sent to the user equipment for the high value subscriber to call regarding the potential service impact.

14. The method of claim 12, wherein when a subscriber is a high value subscriber, a personalized voice message is left on the user equipment regarding the potential service impact.

15. The method of claim 10, further comprising, building a list of top user equipments for each of the plurality of cell towers and sending a notification to top user equipments on a top user equipment list of a cell tower when the cell tower is forecast to have potential service impact, wherein top user equipments are user equipments that have the cell tower on their notification cell tower list.

16. A method of sending proactive notification of potential wireless communications service impacts, comprising:

recording, by an application, voice and data call activities for a plurality of user equipments through a plurality of cell towers for usage recording;

building a list of notification cell towers for each of the plurality of user equipments based on usage during a past predefined period of time;

forecasting service impacts on the plurality of cell towers;

when a top cell tower on a user equipment's notification cell tower list is forecast to have potential service impact, wherein a top cell tower is the cell tower with the most traffic volume usage by a user equipment on a notification cell tower list of the user equipment:

sending to user equipments with high value subscribers a text message notification and a dedicated customer care telephone number a predefined period of time before the potential service impact is forecast to occur, sending a text message notification to devices with medium and low value subscribers a predefined period of time before the potential service impact is forecast to occur, and sending an email notification to high churn subscribers a predefined period of time before the potential service impact is forecast to occur, wherein a high churn subscriber is a subscriber with a higher possibility than a predefined amount to transfer to another mobile communication network; and when any of the cell towers on a notification cell tower list of a user equipment, with a subscriber that calls customer care more than a predefined amount of times every unit time period on average, is forecast to have potential service impact, sending a text message notification to the user equipment.

17. The method of claim 16, wherein the notification cell tower list is periodically updated based on predefined rules.

18. The method of claim 16, wherein cell towers with the most usage from a user equipment and with a ratio of subtotal usage over total usage from the user equipment exceeding a predefined percentage are selected to be recorded on the notification cell tower list.

19. The method of claim 18, wherein the predefined percentage is adapted based on the subscriber type.

20. The method of claim 16, wherein a subscriber of a user equipment that received a notification of potential service impact for a cell tower can access the status of the service impact on the cell tower.

* * * * *